United States Patent [19]

Cogar

[11] 4,365,742
[45] Dec. 28, 1982

[54] HEATING SYSTEM

[76] Inventor: George R. Cogar, R.D. 3, Frankfort, N.Y. 13340

[21] Appl. No.: 139,703

[22] Filed: Apr. 14, 1980

[51] Int. Cl.³ ............................................... F24D 3/00
[52] U.S. Cl. ..................................... 237/81; 237/8 R; 236/9 A; 126/132
[58] Field of Search .......................... 237/8 R, 8 C, 81; 126/132; 165/29; 236/9 A; 219/279

[56] References Cited

U.S. PATENT DOCUMENTS

| 4,046,320 | 9/1977 | Johnson et al. | 126/132 |
| 4,052,001 | 10/1977 | Vogt | 237/8 R |
| 4,230,267 | 10/1980 | Dotschkal et al. | 237/8 R |

*Primary Examiner*—Albert J. Makay
*Assistant Examiner*—Henry Bennett
*Attorney, Agent, or Firm*—Harry M. Weiss

[57] ABSTRACT

A heating system includes a water heating solid fuel stove operated in conjunction with a gas or oil fired hot water furnace. The two are connected in parallel and furnish heat to at least one heating zone and domestic hot water. In a first embodiment, a circulator pump is coupled to receive zone return fluid at its inlet and pump fluid from its outlet to the fluid fuel fired and solid fuel fired boilers. A first water valve is coupled between the circulator outlet and the solid fuel fired boiler, and a second water valve is coupled between the circulator inlet and the solid fuel fired boiler. In a second embodiment, separate circulator pumps are coupled in series with each of the fluid fuel fired and solid fuel fired boilers.

7 Claims, 6 Drawing Figures

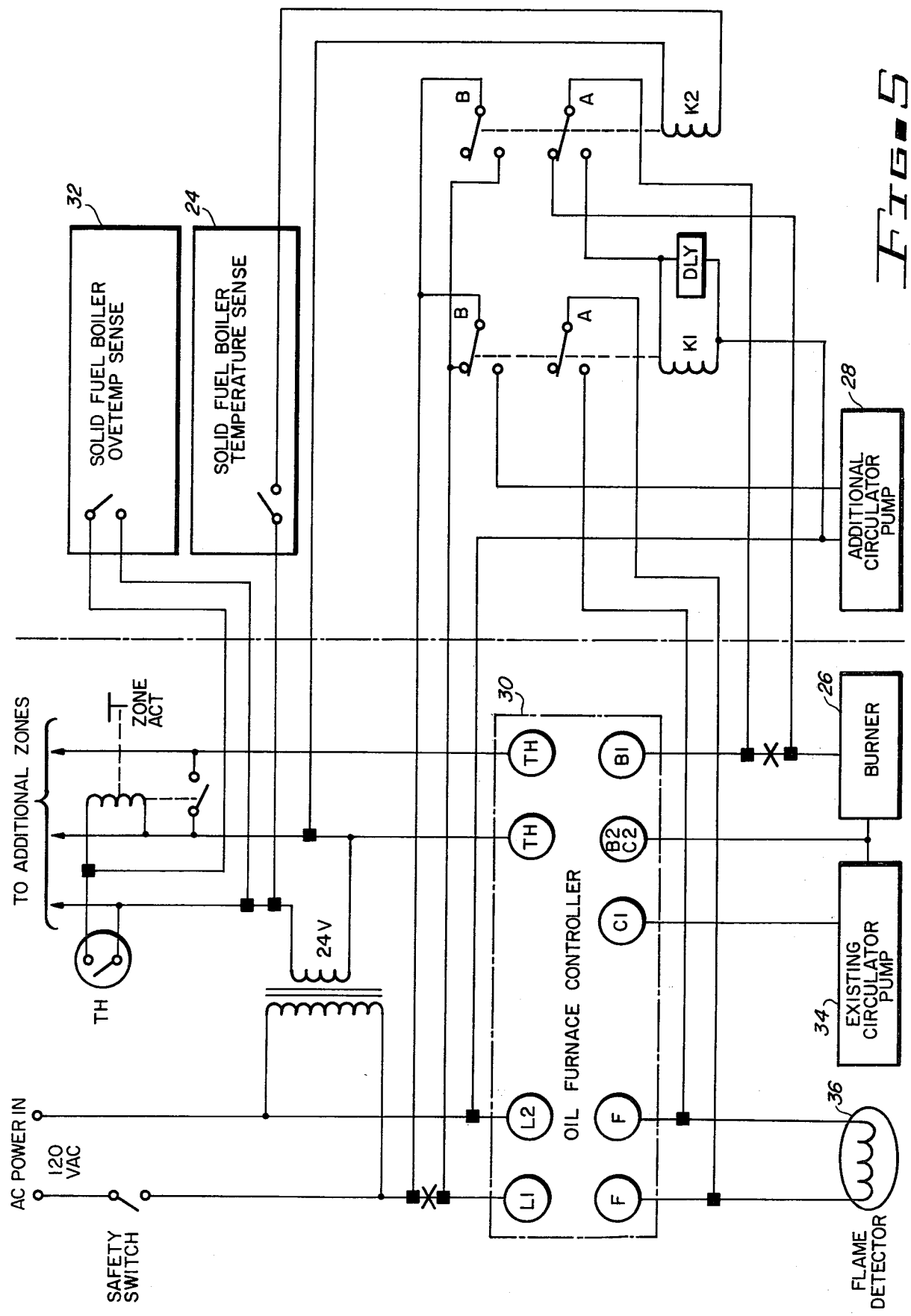

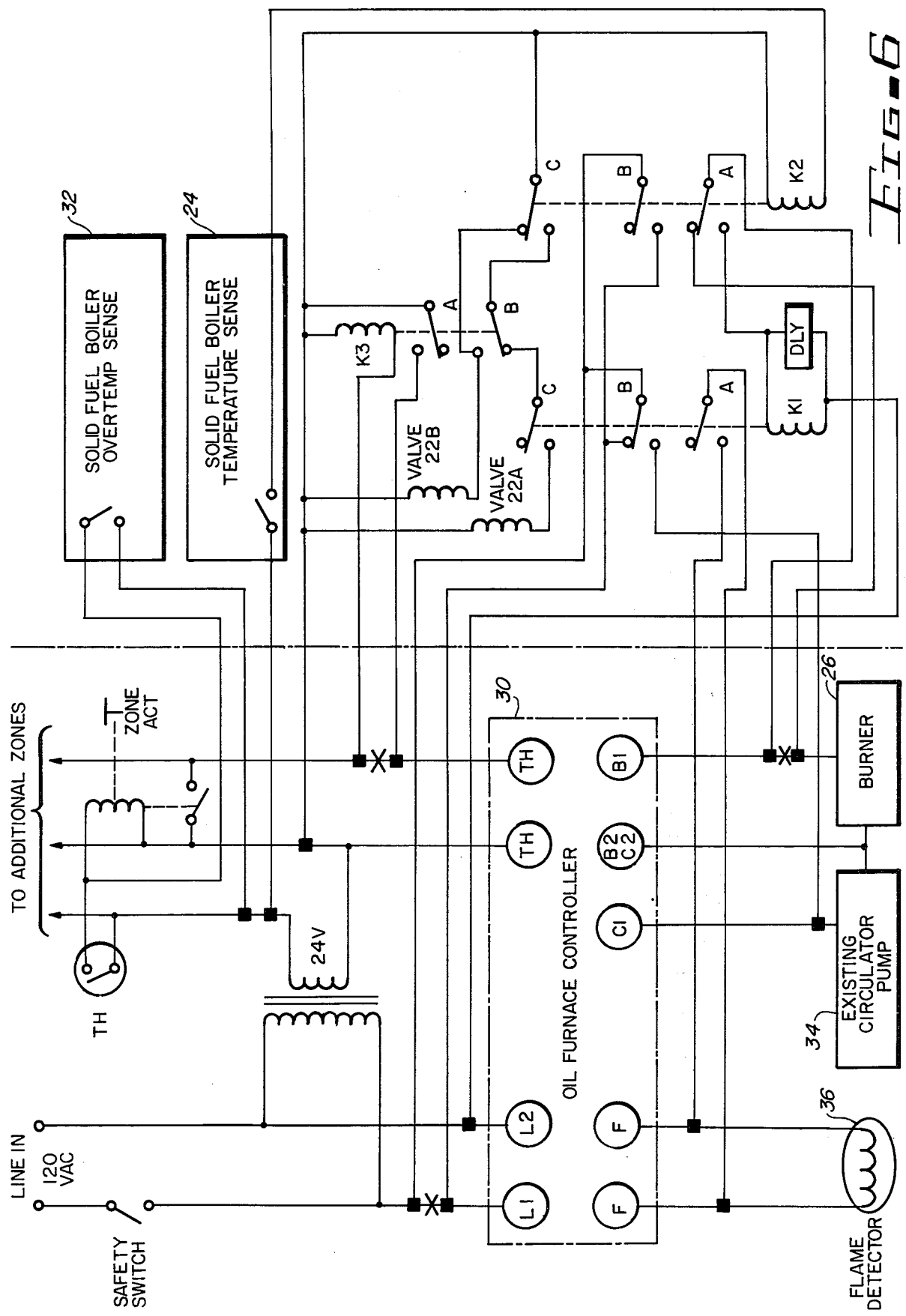

HEATING SYSTEM

BACKGROUND OF THE INVENTION

1. Field of the Invention

This invention relates generally to heating systems and, more particularly, to a heating system which includes a solid fuel burner (i.e. a wood or coal burning stove) used in conjunction with a fluid (gas or oil) fired hot water furnace.

2. Description of the Prior Art

At least two methods of integrating a wood fired heater into an existing gas or oil heating system are known; i.e. a series system and a parallel system. The control systems for both arrangements are substantially identical varying only with respect to water (aquastat) settings for the two burners and, in some cases, modifications of these settings based on external temperature conditions. The intended result is the achievement of a higher water temperature in the wood fired heater than the high limit point of the aquastat controlling the gas or oil burner to minimize the time during which the temperature of the water in the gas or oil fired furnace is equal to or below the temperature at which its burner is activated. This requires a poor compromise in the setting of the aquastat controls on the gas/oil burner.

A typical control system for the gas/oil fired system has a twin level aquastat, one of which has a settable make break differential and is referred to as the low-temp setting. The control setup can vary depending upon whether the system utilizes a tankless or external heat exchanger for domestic hot water. However, the majority of installed systems are tankless meaning that the effective domestic hot water reservoir is limited to the heat exchanger inserted in the water jacket of the water heater.

In the tankless system, the low-temp aquastat is coupled so as to activate the burner independently of zone demand and, thus, maintain water temperature between the limits established by the differential adjustment which, in turn, maintains the low limit for domestic hot water. With the activation of a heating zone, the low-temp aquastat is bypassed and the burner fires until the hi-temp setting is reached. It is relatively standard procedure to control the circulator pump from the make-on-low limit contact of the low-temp aquastat to avoid circulating water at low temperature which is both inefficient and also impacts domestic hot water temperature. This feature has a negative impact on the management of over-temperature conditions in the wood fire heater.

For example, caloric input to a solid fuel heater does not immediately cease upon draft closure. Therefore, the water temperature may rise to above boiling and internal boiler pressure may activate a relief valve. To avoid this, the wood heater controls should include a separate aquastat control for detecting a temperature rise which approaches the boiling point (which varies according to water system pressure) and consequential activation of one of the zone controls which serves to dump the excess heat. However, if the gas/oil heater control is arranged to prevent circulator operation below the low-temp setting, it would be necessary for the gas/oil burner to raise the temperature of the gas/oil boiler prior to any dumping of excess heat from the wood boiler. This creates the possibility, in a series arrangement, of completely disabling the entire heating system upon the loss of the gas/oil fuel supply since, once the low-temp aquastat opens (closing the circulator circuit and calling for burner activation), the only source of heat would be from the wood burner. However, without the circulation, no heat would be transferred between boilers. In a parallel arrangement, the temperature of the gas/oil fired boiler is maintained by convection at a temperature approaching that of the wood fired boiler other than for peak demands on domestic hot water.

A problem in both the series and parallel tankless systems is that domestic hot water temperature cannot be maintained by the wood boiler in the absence of zone demand because (1) in the series arrangement, there is virtually no transfer of heat from the wood boiler to the gas/oil boiler except with the circulator pump running; and (2) in the parallel arrangement, heat transfer by connection is not equivalent to the BTU demand of domestic hot water.

SUMMARY OF THE INVENTION

It is an object of the present invention to provide an improved heating system.

It is a further object of the present invention to provide an improved heating system which includes a wood stove and a gas/oil furnace.

It is a still further object of the invention to provide an improved heating system which provides minimal demands on oil/gas consumption when a wood heater is being fired.

Yet another object of the invention is to provide an improved heating system utilizing a wood stove and a gas/oil furnace and further including automatic, safe and efficient means for controlling which heater provides the primary source of heat.

A still further object of the invention is to provide an improved heating system wherein the existing circulator pump (i.e. the same pump as used for moving heating fluid through radiation) operates in conjunction with two zone valves to effect the unidirectional transfer of heat from a solid fuel fired boiler to a gas/oil fired boiler.

Finally, it is an object of the present invention to provide a method of interconnecting boilers so as to provide unidirectional transfer of heat efficiently from a solid fuel fired boiler to a gas/oil fired boiler to give substantially the same results in heat plant operation as when heat input is from the gas/oil burner.

According to a broad aspect of the invention, there is provided a heating system for supplying heat to at least one zone upon demand and for supplying domestic hot water, said heating system capable of operating in a fluid fuel mode and a solid fuel mode, comprising a fluid fuel heater and boiler assembly connected across said at least one zone for generating heat and hot water when said heating system is in said fluid fuel mode; a solid fuel heater and boiler assembly connected in parallel with said fluid fuel heater and boiler assembly for generating heat and hot water when said system is in said solid fuel mode; and means for delivering heat to said at least one zone upon demand in either said fluid fuel mode or said solid fuel mode and for delivering heat in the solid fuel mode from said solid fuel boiler to said fluid fuel boiler in the absence of zone demand if the temperature of said fluid fuel boiler falls below a predetermined temperature.

According to a further aspect of the invention, there is provided a method for heating at least one zone and for supplying domestic hot water wherein a fluid fuel burning heater and boiler assembly is coupled in parallel with a solid fuel burning heater and boiler assembly, comprising: supplying heat to said at least one zone from said solid fuel boiler when said solid fuel boiler is fired; supplying heat to said at least one zone from said fluid fuel boiler when said fluid fuel boiler is fired; and supplying heat from said solid fuel boiler to said fluid fuel boiler in the absence of zone demand if said solid fuel boiler is fired and the temperature in said fluid fuel boiler falls below a predetermined temperature.

According to a still further aspect of the invention, there is provided a heating system for supplying heat to at least one zone upon demand and for supplying domestic hot water, said heating system capable of operating in a solid fuel mode and a fluid fuel mode, comprising a fluid fuel heater and boiler assembly connected across said at least one zone for generating heat and hot water when said heating system is in said fluid fuel mode; a solid fuel heater and boiler assembly connected in parallel with said fluid fuel heater and boiler assembly for generating heat and hot water when said system is in said solid fuel mode; and means coupled between said at least one zone and said solid and fluid fuel boilers for transmitting zone return fluid to said fluid fuel boiler when the temperature of said fluid fuel boiler rises to a first predetermined temperature and when the temperature of said solid fuel boiler falls below a second predetermined temperature and to said solid fuel boiler when the temperature of said solid fuel boiler rises to said second predetermined temperature and when the temperature of said fluid fuel boiler falls below said first predetermined temperature.

According to a yet further aspect of the invention, there is provided a method for heating at least one zone and for supplying domestic hot water wherein a fluid fuel burning heater and boiler assembly is coupled in parallel with a solid fuel burning heater and boiler assembly, comprising transmitting zone return fluid to said fluid fuel boiler when the temperature of said fluid fuel boiler rises to a first predetermined temperature or when the temperature of said solid fuel boiler falls below a second predetermined temperature; and transmitting zone return fluid to said solid fuel boiler when the temperature of said solid fuel boiler rises to said second predetermined temperature and when the temperature of said fluid fuel boiler falls below said first predetermined temperature.

The above and other objects, features, and advantages of the present invention will be better understood from the following detailed description taken in conjunction with the accompanying drawings, in which:

BRIEF DESCRIPTION OF THE DRAWINGS

FIGS. 5 and 6 illustrate diagramatically the controls for implementing the addition of solid fuel boilers as shown in FIGS. 3 and 4 respectively.

DESCRIPTION OF THE PREFERRED EMODIMENT

Figure 1:
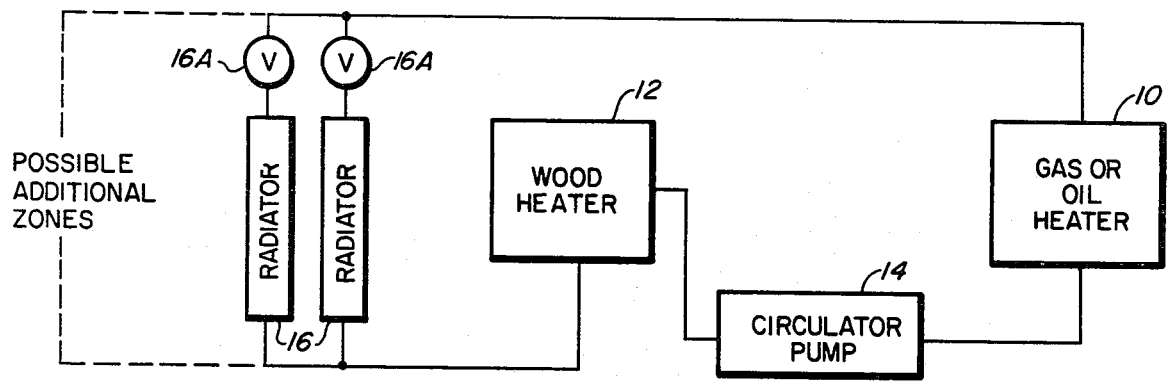
FIG. 1 is a block diagram of a series heating arrangement, according to the prior art, which includes a wood burning heater and a gas/oil heater.
Figure 2:
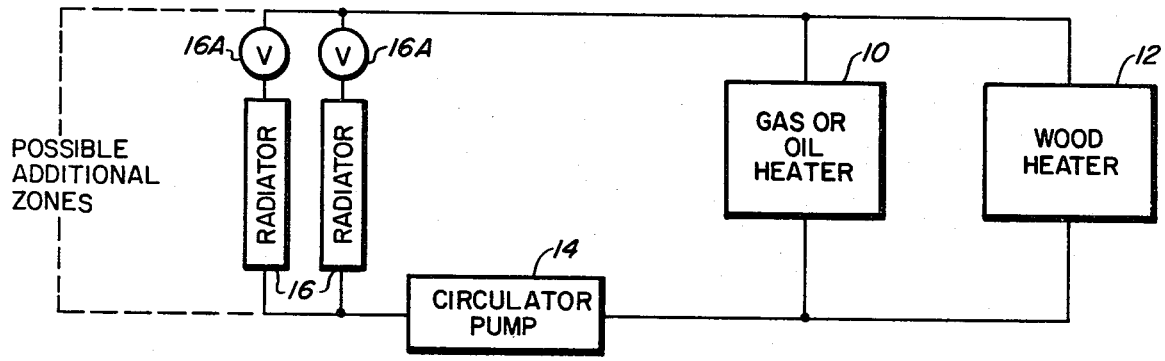
FIG. 2 is a block diagram of a parallel heating arrangement, according to the prior art, which includes a wood burning heater and a gas/oil heater.

FIGS. 1 and 2 are block diagrams of series and parallel heating systems, respectively, according to the prior art. Referring to FIG. 1, there is shown a heating system comprising a gas or oil heater 10 coupled in series with a wood heater 12. Between gas or oil heater 10 and wood heater 12 is a circulator pump 14. Coupled across the above described series arrangement is a plurality of zone radiators 16, each having coupled in series therewith an actuator valve 16A (e.g. solenoid valve) for controlling the zone radiators. It should be noted, however, that zone radiators 16 may be manually controlled, thus, eliminating the need for solenoid valves 16A.

Referring to FIG. 2, it will be noted that wood heater 12 has been placed in parallel with gas or oil heater 10.

Figure 3:
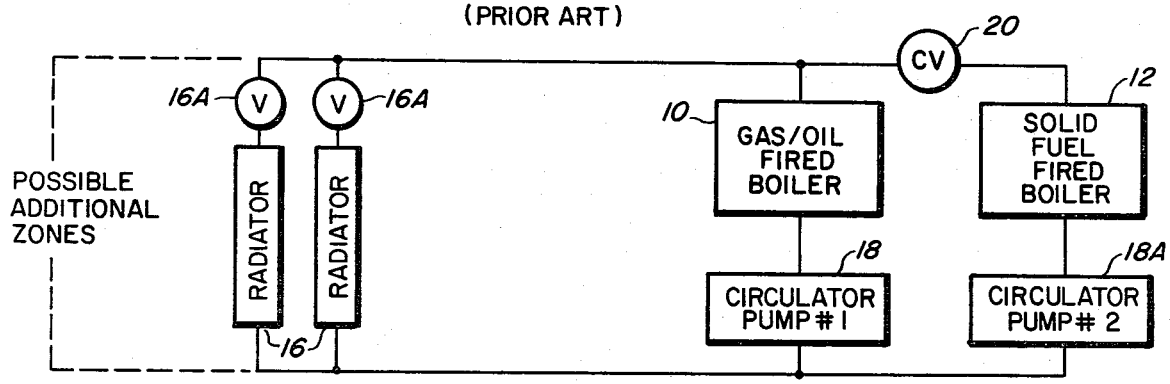
FIG. 3 is a block diagram of a parallel heating arrangement, according to the present invention, which includes two circulator pumps and a check valve.

The disadvantages of these prior art arrangements has been thoroughly described above and will not be repeated herein. These disadvantages are largely overcome by the systems shown in FIGS. 3 and 4 in which like elements are denoted with like reference numerals. Referring to FIG. 3, there is shown a block diagram of a parallel heating system which includes first and second circulator pumps 18 and 18A respectively. The first circulator pump 18 is coupled in series with gas/oil fired boiler 10 and the series combination of boiler 10 and pump 18 is coupled in parallel with the radiation zones (16 and 16A). The solid fuel fired boiler 12 has an input side coupled to the second circulator 18A and an output side coupled to check valve 20. The series combination of circulator 18A, boiler 12, and valve 20 is coupled in parallel with the series combination of circulator 18 and boiler 10.

When the system is operating in the gas/oil fired mode, all controls for the gas/oil heater are effectively unmodified and the heating system functions unaffected by solid fuel boiler 12. Check valve 20 prevents the flow of heated water from gas/oil boiler 10 to the solid fuel fired boiler 12 and, thus, the latter boiler 12 will be maintained at a temperature, if not fired, roughly equivalent to ambient room temperature.

Solid fuel fired boiler 12 is provided with means (e.g. aquastats) for detecting the following three predetermined temperature points: (1) over temperature (210° F.-220° F.); (2) boiler draft control (180° F.-190° F.); and (3) boiler active (145° F.-155° F.).

When the water temperature of the boiler reaches the over temperature point, a zone valve is activated to dump excess heat. The boiler draft control maintains the operating temperature of the boiler. (For boiler types having a mechanically linked thermostatic-draft control, detection of this point is not necessary.) A holding delay relay is responsive to the boiler active point. The relay is activated as a result of a temperature rise above the set point and remains activated as long as the activating signal is not removed for a predetermined time period (typically in excess of 4–5 minutes). When activated, the relay places the heating system in the solid fuel mode. The delay prevents intermittent transfer to the gas/oil mode during peak BTU demand and lag in solid fuel fire build up after opening the draft.

Solid fuel fired boiler 12 could be provided with a dual temperature level draft control with one set point for "demand" and a lower set point for "idle" (no heat demand). The selected idling temperature must be higher than the boiler active point (145° F.-155° F.). Furthermore, it is feasible to combine the functions of idling temperature control and boiler active by adjusting the period of the holding delay to correspond to the time required for temperature over the differential of the idle temperature setting.

If the temperature of the solid fuel boiler 12 falls below the boiler active point and remains there for longer than five minutes, the controls for the gas/oil burner function in accordance with their original design and the overall system operates as though solid fuel boiler 12 were not in the system. If solid fuel boiler 12 is fired and the temperature in boiler 12 reaches the boiler active point, any call for burner operation of the gas/oil heater will activate circulator pump 18A bringing the temperature of the two boilers into equilibrium or until heat demand from gas/oil boiler 10 is satisfied. If the call for burner operation resulted from activation of a low temperature aquastat, only circulator pump 18A would be active, and the direction of boiler fluid flow would be from outlet to inlet of the gas/oil burner. Circulator pump 18A would continue to operate until the low temperature set point of the gas/oil burner aquastat had been achieved. boilers. If circulation continues until gas/oil boiler 10 rises to the high temperature point, circulator pump 18A is turned off and circulator pump 18 continues to operate.

Figure 4:
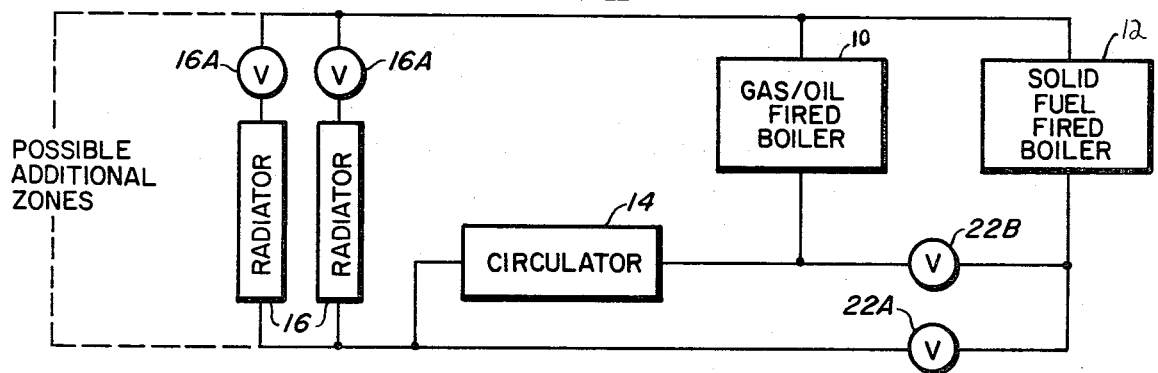
FIG. 4 is a block diagram of a parallel heating arrangement, according to the present invention, which includes automatic transfer valves.

FIG. 4 is a block diagram of a second embodiment of the invention. As in the case of the prior art parallel arrangements (FIG. 2), the system includes a gas/oil fired boiler and associated heater 10, a solid fuel fired boiler and associated heater 12, a circulator pump 14, and a plurality of zone radiators 16 and zone valves 16A. In addition, the system includes first and second control valves 22A and 22B, respectively, coupled as shown in FIG. 4. Valves 22A and 22B are of the same general type as utilized for control of radiation zones but having control manifolds of a size to match the repiping which interconnects the two boilers (10 and 12).

In the oil/gas mode, valves 22A and 22B are both off (closed), and the heating system operates as if the solid fuel boiler 12 did not exist. With the solid fuel boiler 12 fired and the system in the solid fuel mode, two conditions can prevail depending on the temperature in the gas/oil boiler 10.

These are as follows:
(1) In the absence of zone demand (radiation), valve 22A is closed and valve 22B is open. If the fluid temperature of the gas/oil boiler 10 should fall below the low temperature set point (due to demand from domestic hot water), valve 22A opens, valve 22B closes, and the circulator pump 14 activates until the low temperature set point is reached. In the absence of domestic hot water demand over a period of time, the temperature of the two boilers would reach equilibrium simply by convection via valve 22B. Thus, in the absence of radiation zone demand, circulator pump 14 will only run when convection cannot keep pace with domestic hot water BTU demand.

(2) In the event of radiation zone demand, valve 22A closes, valve 22B opens, and circulator 14 is activated. In this configuration, circulator operation is effective regardless of the temperature of gas/oil boiler 10 under radiation zone demand as the circuit normally calling for burner operation in the gas/oil mode calls for circulator operation in the solid fuel mode.

FIGS. 5 and 6 illustrate diagramatically the controls for implementing the addition of solid fuel boilers as shown in FIGS. 3 and 4 respectively. In each drawing, the portion to the left of the dotted line illustrates a typical control set-up for an oil fired boiler. An "X" through a line indicates a break in an existing line and a darkened rectangular portion indicates a connection to an existing line.

In more modern oil burner units, the flame detector function is integral, and the burner assembly is activated by a twenty-four volt control line. In this case, the contact utilized to bypass the flame detector is used instead to activate the burner assembly.

Relay K1 in FIGS. 5 and 6 has a delayed drop-out to provide for temporary removal of power from the furnace controller when switching from a solid fuel mode to a liquid fuel mode. Relay K2 can be a delay or drop relay. In lieu of this, the temperature sensor 24 for the solid fuel boiler may have an intrinsic differential between make and break.

Referring now to FIG. 5, with no fire in the solid fuel boiler, K2 is open which keeps K1 open. The connection between B1 and burner 26 is established via the normally closed contact of K2. The high side of the power connection is coupled to L1 via the normally open contact of K1. With the solid fuel boiler fired and the boiler temperature reaching the set point of solid fuel temperature sensor 24, K2 closes which breaks the connection from B1 to burner 26, makes a connection from B1 to one side of the actuating coil of K1, and provides an alternate connection path for the high side of power into L1.

With K2 activated and B1 active (i.e. furnace calling for heat), K1 closes connecting, via K1 B1, power to circulator 28 and shorting out the flame detector so as to simulate the actual operation of the burner.

When the temperature of the solid fuel boiler drops to the drop-out point of temperature sensor 24, K2 releases. In the normal case, this will occur with B1 active (and consequently K1 closed) as the solid fuel boiler temperature is reduced by BTU demand from the liquid fuel boiler. With B1 active when K1 releases, primary power to the furnace controller 30 is removed for a period equal to the holding delay of K1 (typically 0.5 second). This assures that the oil furnace controller 30 will perform the "shorted" flame detector test. If B1 is not active when K2 releases, the delay is not required.

As shown, the circuit includes a solid fuel boiler over temperature sensor 32, a circulator 34 coupled to C1, C2/B2, and burner 26, and a flame detector 36 coupled to F/F.

Referring now to FIG. 6, the close and release cycle of K1/K2 is the same. An additional control is added to both relays to effect control of valves 22A and 22B. These valves can only be operated with K2 closed. With K2 closed and no BTU demand from the liquid fuel boiler, valve 22B will be open and remain open allowing for heat transfer between the liquid fuel boiler and the solid fuel boiler by convection. Closure of any zone valve effects the closing of K3 which effects the bridging of the TH contacts of the furnace controller 30 and the consequent activation of circulator 38. Additionally, if the temperature of the liquid fuel boiler is below the high limit setting, B1 will activate with the consequent effect of closing K1. Contact K3b bypasses K1C and valve 22B remains activated.

In the absence of zone demand and the temperature of the liquid fuel boiler falling below the low temperature set point, B1 activates closing K1. Contact K1C, transferring to the normally open state, releases valve 22B and energizes valve 22A. Additionally, contact k1B energizes the circulator 38 causing heat exchange fluid to be pumped from the inlet to the outlet of the liquid fuel boiler, then to the outlet of the solid fuel boiler and from the inlet of the solid fuel boiler via valve 22A back to the inlet of the circulator 38. This continues until the low temperature sensor detects a temperature above the set point plus a differential.

The above description of preferred embodiments is given by way of example only. Changes in form and details may be made by one skilled in the art without departing from the scope of the invention as defined by the appended claims.

What is claimed is:

1. A heating system for supplying heat to at least one zone upon demand and for supplying domestic hot water, said heating system capable of operating in a fluid fuel mode and a solid fuel mode, comprising:
   a fluid fuel heater and boiler assembly connected across said at least one zone for generating heat and hot water when said heating system is in said fluid fuel mode;
   a solid fuel heater and boiler assembly connected in parallel with said fluid fuel heater and boiler assembly for generating heat and hot water when said system is in said solid fuel mode; and
   means for delivering heat to said at least one zone upon demand in either said fluid fuel mode or said solid fuel mode and for delivering heat in the solid fuel mode, from said solid fuel boiler to said fluid fuel boiler in the absence of zone demand if the temperature of said fluid fuel boiler falls below a predetermined temperature.
   said means comprises:
   a circulator pump having an inlet and outlet connected between said at least one zone and the fluid fuel and solid fuel boilers for receiving water at its inlet from said at least one zone during zone demand and pumping it through said fluid fuel boiler in the fluid fuel mode and through said solid fuel boiler in the solid fuel mode and for receiving water at its inlet from said solid fuel boiler and pumping it through said fluid fuel boiler in the absence of zone demand in the solid fuel mode if the temperature in said fluid fuel boiler falls below a predetermined temperature;
   a first water valve coupled between said fluid fuel boiler and said solid fuel boiler, said first water valve being closed in the fluid fuel mode and, in the absence of zone demand, in the solid fuel mode, said first water valve being open in the solid fuel mode during zone demand; and
   a second water valve coupled between the inlet of said circulator pump and said solid fuel boiler, said second water valve being closed in the fluid fuel mode and, during zone demand, in the solid fuel mode, said second water valve being open in said solid fuel mode in the absence of zone demand.

2. A heating system according to claim 1 wherein said solid fuel heater is a wood burning stove.

3. A heating system according to claim 1 wherein said solid fuel heater is a coal burning stove.

4. A heating system according to claim 1 wherein said fluid fuel heater is an oil burning furnace.

5. A heating system according to claim 1 wherein said fluid fuel heater is a gas burning furnace.

6. A heating system according to claim 1 wherein said at least one zone is thermostatically controlled.

7. A method for heating at least one zone and for supplying domestic hot water wherein a fluid fuel burning heater and boiler assembly is coupled in parallel with a solid fuel burning heater and boiler assembly and wherein a circulator pump having an inlet and an outlet is coupled in series with said at least one zone for receiving zone return fluid, comprising:
   closing first and second water valves when said fluid fuel boiler is fired, said first valve being coupled between said outlet and the solid fuel boiler and said second valve coupled between said inlet and the solid fuel boiler;
   opening said first valve and closing said second valve in a solid fuel mode upon demand for heat from said at least one zone;
   closing said first valve and opening said second valve in said solid fuel mode in the absence of zone demand; and
   activating said circulator pump in the absence of zone demand if in said solid fuel mode and the temperature of the fluid fuel boiler falls below a predetermined value and upon zone demand.

* * * * *